United States Patent [19]

Shibata

[11] Patent Number: 4,625,250
[45] Date of Patent: Nov. 25, 1986

[54] MULTI-TRACK MAGNETIC HEAD

[75] Inventor: Norio Shibata, Sagamihara, Japan

[73] Assignee: Victor Company of Japan, Limited, Japan

[21] Appl. No.: 456,324

[22] Filed: Jan. 6, 1983

[30] Foreign Application Priority Data

Jan. 7, 1982 [JP] Japan .................................. 57-771[U]

[51] Int. Cl.$^4$ ............................ G11B 5/16; G11B 5/20
[52] U.S. Cl. ..................................... 360/121; 360/125
[58] Field of Search ........................ 360/121, 119–120, 360/122–123, 125–127

[56] References Cited

U.S. PATENT DOCUMENTS

| | | | |
|---|---|---|---|
| 3,986,210 | 10/1976 | Sugaya et al. | 360/123 |
| 4,190,872 | 2/1980 | Jones, Jr. et al. | 360/122 X |
| 4,219,855 | 8/1980 | Jones, Jr. | 360/125 |
| 4,422,117 | 12/1983 | Nomura et al. | 360/122 X |
| 4,423,451 | 12/1983 | Chi | 360/125 |
| 4,458,279 | 7/1984 | Katz | 360/123 |

FOREIGN PATENT DOCUMENTS

| | | |
|---|---|---|
| 2819208 | 11/1979 | Fed. Rep. of Germany . |
| 707637 | 4/1954 | United Kingdom . |
| 913296 | 12/1962 | United Kingdom . |
| 1373101 | 11/1974 | United Kingdom . |
| 1513271 | 6/1978 | United Kingdom . |
| 1525007 | 9/1978 | United Kingdom . |

Primary Examiner—John H. Wolff
Attorney, Agent, or Firm—Lowe, Price, Leblanc, Becker & Shur

[57] ABSTRACT

A multi-track magnetic head comprises a first core half having a plurality of thin film cores made by thin film forming technique, and a second core half having a plurality of block cores and a plurality of block spacers which are stacked in advance. The first and second core halves are assembled so that they face each other. Each of the block cores has a U-shaped recess so that the block core is spaced from the thin film core except for both ends thereof. A coil of each head may be made of spiral coil pattern conductive layer deposited on the thin film core with an interposition of an insulating film, or may be a wire wound around the body of the block core.

8 Claims, 6 Drawing Figures

MULTI-TRACK MAGNETIC HEAD

BACKGROUND OF THE INVENTION

This invention relates to multi-track magnetic heads and a method of fabricating a multi-track magnetic head, and more particularly, the present invention relates to magnetic heads having thin film cores formed by a thin film forming technique.

Multi-track magnetic heads used in various magnetic recording/reproducing apparatus, such as tape recorders, computer storages or the like, are generally divided into two sorts, one being coil-wound magnetic heads, and the other being thin film magnetic heads. In coil-wound magnetic heads, a pair of core halves are made of substantially the same material through substantially the same manufacturing process, and it is necessary to obtain a predetermined track width and a predetermined track pitch with a plurality of core members and a plurality of spacers finished with very high precision. For instance, when manufacturing a ten-track multi-track magnetic head, in order to set the in-line direction size accuracy of a core half to be formed by alternately stacking ten core members and nine spacers, the size accuracy of each of the core members and the spacers is required to be so accurate that it is 19 times the accuracy of the above-mentioned size accuracy. Furthermore, if corresponding core members in a pair of core halves were not similarly formed, position error would occur when the pair of the core halves are assembled to face each other, resulting in error in track width and track pitch. Therefore, it is troublesome to manufacture coil-wound magnetic heads, and there have been drawbacks that productivity is low and it is inevitable that heads of this sort are expensive.

On the other hand, in thin film heads manufactured by thin film forming technique, predetermined accuracy as to track width, track pitch etc. may be readily obtained as long as the accuracy of the mask is satisfactory, and there is an advantage of easy manufacturing and inexpensive products. However, since thin film heads have lamination structure such that a film core is formed on a conductive layer formed on another film core, the two films are too close to each other, resulting in the formation of a short-circuited magnetic path so that it is impossible to obtain sufficient high magnetic field output. Due to this drawback therefore, it has been difficult to use thin film heads as a record head or a record/reproduce head which are required to have high intensity magnetic field output. Although it is theoretically possible to form a plurality of conductive layers in lamination by thin film forming technique so as to obtain high magnetic field output, such manufacturing method results in an increase in manufacturing processes, and therefore suffers from a drawback that the thin film head would be expensive in turn.

SUMMARY OF THE INVENTION

The present invention has been developed in order to remove the above-described drawbacks inherent to the conventional multi-track magnetic heads.

It is, therefore, an object of the present invention to provide a new and useful multi-track magnetic head which can be readily manufactured with low manufacturing cost and high productivity, and a method of fabricating the same.

A feature of the present invention is that high intensity magnetic field output can be obtained even if the magnetic head comprises a thin-film core.

In order to achieve the above object and feature in the present invention, each head constituting a multi-track head is fabricated such that a film core is formed on a substrate by thin film forming technique, and then an insulating film is formed on the film core so as to provide a gap, and then a block core having a U-shaped cross-section is assembled with the substrate having the film core and the insulating film thereon so that the insulating film is interposed between a portion of the block core and a portion of the film core. The above-mentioned structure is continuously formed in the direction of track width to provide as many as the number of head gaps required in the multi-track magnetic head.

In accordance with the present invention there is provided a multi-track magnetic head, comprising a plurality of heads arranged in line, each of said heads comprising: a substrate; a thin film core formed on one surface of said substrate so as to cover said surface partially, one end of said thin film core being located so that said one end of said thin film core is flush with one end of said substrate; an insulating film formed on said thin film core so as to partially cover said thin film core around said one end; a block core having a U-shaped recess, and secured to said substrate, thin film core, and insulating film, said block core having front and rear ribs which are substantially parallel to each other, and a web interposed between said front and rear ribs, said block core being assembled with said substrate on which said thin film core and said insulating film are formed, in such a manner that an open end of said front rib is placed on said insulating film so that one end of said block core is flush with said one end of said thin film core and said one end of said substrate; that an open end of said rear rib is placed on said thin film core around the other end thereof; and that said web is spaced from said thin film core by a predetermined distance; and a winding having a portion received in a space defined by the surface of said insulating film and said U-shaped recess of said block core.

In accordance with the present invention there is also provided a method of fabricating a multi-track magnetic head, having a plurality of heads arranged in line, comprising the steps of: forming a plurality of film cores on a substrate so that the thin film cores are substantially parallel to each other, by a thin film forming method; forming a plurality of film insulators on said thin film cores so that each thin film core is partially covered by said film insulator, said film insulators, thin film cores and substrate constituting a first core half; forming a plurality of coil patterns on said film insulators and said substrate so that each coil pattern is partially placed on each of said film insulators; independent of the above steps, forming a second core half having a plurality of block cores and spacers each interposed between two consecutive block cores, each of said block cores having a U-shaped recess, and having front and rear ribs which are substantially parallel to each other, and a web interposed between said front and rear ribs; and assembling said second core half with said first core half so that said first and second core halves face each other, said second core half being assembled with said first core half, in such a manner that an open end of said front rib is placed on said insulating film so that one end of said block core is flush with one end of said thin film core and one end of said substrate; that an open end of said rear rib is placed on said thin film core around the other end thereof; and that said web is spaced from said thin film core by a predetermined distance.

In accordance with the present invention there is further provided a method of fabricating a multi-track magnetic head, having a plurality of heads arranged in line, comprising the steps of: forming a plurality of thin film cores on a substrate so that the thin film cores are substantially parallel to each other, by a thin film forming method; forming a plurality of film insulators on said thin film cores so that each thin film core is partially covered by said film insulator, said film insulators, thin film cores and substrate constituting a first core half; and independent of the above steps, forming a second core half having a plurality of block cores each having a winding therearound and spacers each interposed between two consecutive block cores, each of said block cores having a U-shaped recess, and having front and rear ribs which are substantially parallel to each other, and a web interposed between said front and rear ribs; and assembling said second core half with said first core half so that said first and second core halves face each other, said second core half being assembled with said first core half, in such a manner that an open end of each of said front ribs is placed on said film insulator so that one end of said block core is flush with one end of said thin film core and one end of said substrate; that an open end of said rear rib is placed on said thin film core around the other end thereof; and that said web is spaced from said thin film core by a predetermined distance.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated by like reference numerals throughout the drawings.

DETAILED DESCRIPTION OF THE INVENTION

Figure 1:
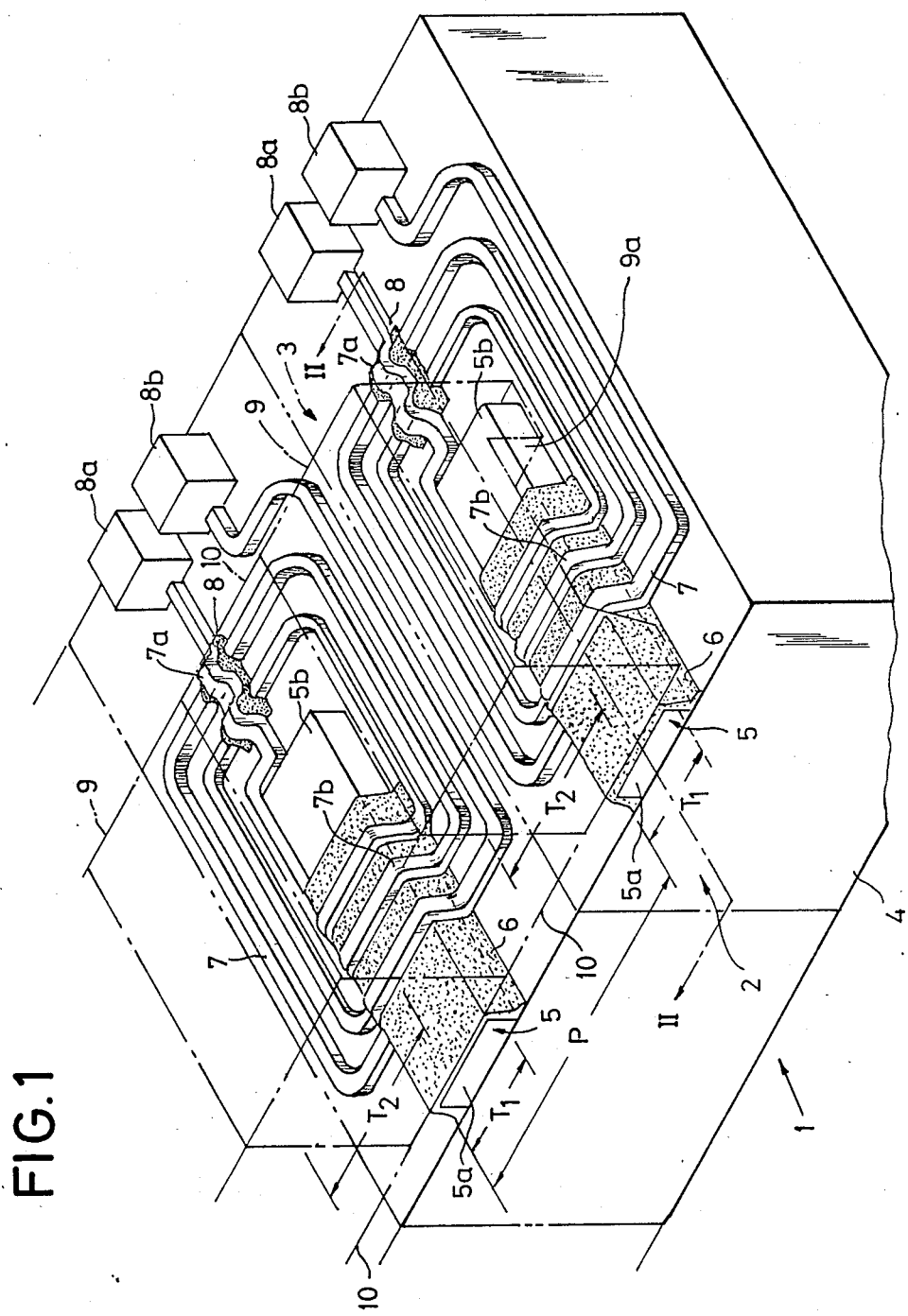
FIG. 1 is a schematic perspective view of a first embodiment of the multi-track magnetic head according to the present invention.

Referring now to FIG. 1, a schematic perspective view of an embodiment of the multi-track magnetic head according to the present invention is shown. A multi-track magnetic head which is generally designated at the reference 1 comprises a plurality of heads arranged in line. In FIG. 1, only two consecutive heads forming a part of the multi-track magnetic head 1 are shown for simplicity. The multi-track magnetic head 1 generally comprises a first core half 2 and a second core half 3 which are assembled so that the first and second core halves 2 and 3 face each other to provide a plurality of head gaps.

The first core half 2 comprises a substrate 4 made of glass or the like, a plurality of parallel thin film cores 5 deposited on one surface of the substrate 4, a plurality of insulating films 6 each partially covering each thin film core 5, a plurality of spiral coil patterns 7 made of a conductive material, each formed on and around each insulating film 6. Tne second core half 3 shown by way of a dot-dash line comprises a plurality of block cores 9 and a plurality of spacers 10 which are alternately stacked, where the block cores 9 are made of a ferromagnetic material as will be described later and the spacers 10 are made of glass or the like. It is to be noted that these spacers 10 are used to magnetically isolate adjacent block cores 9 each other and should not be confused with spacers usually used to constitute gaps. Namely, each spacer 10 is interposed between two consecutive block cores 9 which are arranged in line in the direction of track width. The block cores 9 and the spacers 10 are adhered to each other to form a block-stacked member which has a plate like shape.

Both the above-mentioned thin film cores 5 and the block cores 9 are made of a ferromagnetic substance. Namely, the thin film cores 5 may be made of ferrite, Sendust or the like, and the the block cores 9 may be made of permalloy, ferrite, Sendust, amorphous magnetic substance or the like. The thin film cores 5 are formed by thin film forming technique or method as will be described later, whereas the block cores 9 are provided by simply cutting from magnetic material in mass. Such a block core is sometimes referred to as a bulk core. By the words "thin film" is meant a film having a thickness of several micrometers or less, while by the word "block" is meant a mass having a thickness greater than hundreds of micrometers.

Each of the thin film cores 5 has a dimension or length expressed in terms of $T_1$ in track width direction, and the parallel thin film cores 5 are equidistantly spaced from each other so as to define track pitch P.

Two-dot-dash lines shown in the substrate 4 indicate the boundary between two consecutive heads constituting the multi-track magnetic head 1. Since each head has a substantially identical structure, the structure of the multi-track magnetic head 1 will be described in connection with a single head portion.

The thin film core 5 is formed, on the surface of the substrate 4 by way of one of several well known thin film forming techniques, such as vapor deposition, sputtering, etching etc. One end of the thin film core 5 is located so as to be flush with one end of the substrate 4 as shown at the right side of the thin film core 5 and the substrate 4 in FIG. 1. This side of the multi-track magnetic head 1 is a front side which will contact with a magnetic recording medium in use. The thin film core 5 made of a ferromagnetic material is formed to a thickness of 0.1 to 5 micrometers.

Figure 3:
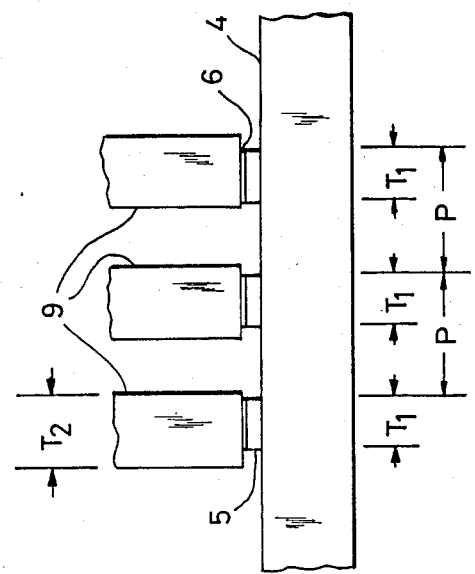
FIG. 3 is an explanatory front view of the multi-track magnetic head according to the present invention.
Figure 2:
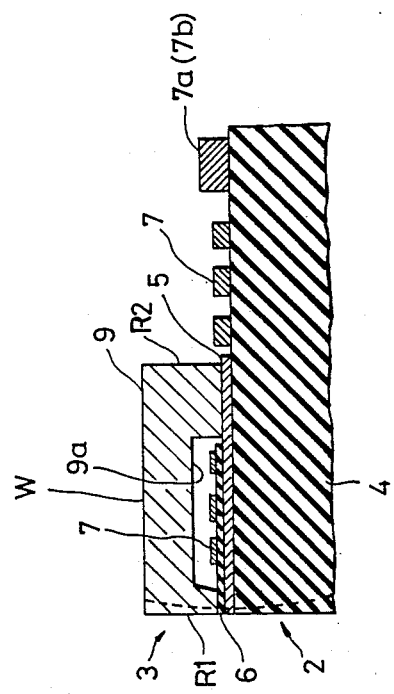
FIG. 2 is a schematic cross-sectional side view taken along a plane, including a line II—II of FIG. 1.

The electrical insulating film 6 is deposited on the exposed surfaces of the thin film core 5 such that the right or front end 5a and surfaces 5b close to the left or rear end are uncovered by the insulating film 6. The insulating film 6 may be made of SiO, $SiO_2$, $Al_2O_3$ in the same manner as in conventional thin film heads. The front end 5a is referred to as a tape-sliding portion 5a, and the surface 5b close to the rear end is referred to as a rear core-contact portion 5b. The surfaces 5b not covered by the insulating film 6 will be connected to one end of the block core 9 so as to constitute a magnetic circuit as will be described later. The insulating film 6 in the vicinity of the front end 5a of the thin film core 5 will provide a gap of the head. The electrical insulating film 6 is shown by dotted or sprinkled pattern in FIG. 1. As shown in FIGS. 1, 2 and 3, the front end of insulating film 6 is flush with the front end of thin film core 5.

The reference 7 is a spiral coil centering substantially the rear contacting portion 5b, and its both ends are connected to bonding pads 8a and 8b. This coil 7 is constructed by forming first a conductive layer by thin film forming technique, and then the conductive layer is plated with a metallic layer. These layers are etched in a conventional manner so as to provide the spiral pattern. The spiral coil 7 is partially placed on the insulating film 6 formed on the thin film core 5 so as to produce magnetic flux in the thin film core 5 when being energized. Although the number of turns is shown to be three in FIG. 1, the number of turns is preferably five or more. Assuming that the number of turns of the spiral coil 7 is five, a magnetomotive force of 1 AT will be obtained when electric current of 200 milliampers is applied. Since the amount of current required is relatively large compared to coil-wound type magnetic heads, the cross-sectional area of the spiral coil 7 is made large enough. The reference 8 is an electrical insulating film which prevents a lead wire portion 7a of the coil 7, extending to the bonding pad 8a, from being in direct contact with the wound portion of the coil.

The block core 9 of the second core half 3 has a U-shaped recess as best seen in cross-sectional side view of FIG. 2. The U-shaped recess is referred to as a winding groove 9a because a portion of the above-mentioned spiral coil 7 will be received in or covered by the U-shaped recess when the second core half 3 is assembled with the first core half 2. Although the block core 9 is single member cut from a magnetic material in mass, it is assumed tht the block core 9 comprises front and rear ribs or legs R1 and R2, and a web or beam W interposed between the two ribs R1 and R2. The block core 9 has a dimension or length $T_2$ in track width direction, where $T_2$ is greater than the length $T_1$ of the thin film core 5 by 10 to 30 percent. The height or thickness of the block core 9 measured in a direction parallel to the ribs R1 and R2 is between 2 and 5 millimeters in this embodiment.

The length $T_1$ of the thin film core 5 will define a track width as will be described later, and may be changed in accordance with a designed track width in view of track numbers and the entire width of a recording medium such as a recording tape. In this embodiment, the length $T_1$ is of the order of a hundred micrometers.

The first core half 2 and the second core half 3 are assembled such that they face each other in such a manner that wound portion 7b of the coil 7 on the electrical insulating film 6 is positioned within the winding groove 9a. In detail, the second core half 3 is attached to the first core half 2 so that an open end of the front rib R1 is placed on the insulating film 6 with the front end of the block core 9 being flush with the front end 5a of the thin film core 5 and the substrate 4, and an open end of the rear rib R2 is placed on the exposed surface or core-contacting portion 5b of the thin film core 5.

At the front end of the head, therefore, the insulating film 6 is sandwiched between the thin film core 5 and the front rib R1 of the block core 9 so that the gap length is defined by the thickness of the insulating film 6. In order to assemble the first and second core halves 2 and 3, the second core half 3 may be screwed or adhered to the first core half 2 so that the second core half 3 is secured to the first core half 2.

After assembling, the front end of the multi-track magnetic head 1 may be polished so as to provide a convexly curved front end or recording medium contacting surface as indicated by a dotted line in FIG. 2.

In this way the first core half 2 having a plurality of thin film cores 5 is constructed by thin film forming technique, and the second core half 3 is constructed of a plurality of block cores 9 and spacers 10. Therefore, fabrication is easy and manufacturing cost is low compared to the case that both core halves are made of block cores. The multi-track magnetic head 1 operates such that a closed magnetic circuit is formed by the thin film core 5, the gap at the front end, the U-shaped block core 9 connected to the rear core-contacting portion 5b of the thin film core 5, so that magnetic flux induced by the current flowing through the spiral coil 7 circulates through the magnetic path of the magnetic circuit.

The intensity of magnetic field may be made relatively large since the distance between the two cores can be made large. In other words, since the web W of the block core 9 is spaced from the thin film core 5 because of the provision of the U-shaped recess 9a, short circuting the magnetic path is effectively prevented. According to experiments, although 30 to 70 percent of the magnetic flux leaks from the magnetic path in the conventional thin film magnetic heads, such leakage flux in the head according to the present invention is negligibly small.

Figure 4:
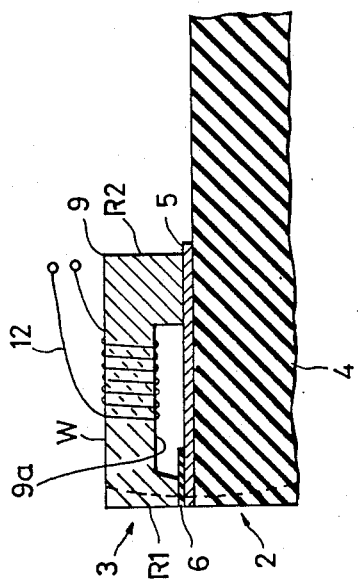
FIG. 4 is a schematic cross-sectional side view of a second embodiment of the multi-track magnetic head according to the present invention.

Furthermore, since the block core 9 has the length $T_2$ in track width direction, which is greater than the length $T_1$ of the thin film core 5, the thin film core 5 is necessarily received within the length $T_2$ of the core 9 in track width direction even if a deviation in track width direction occurs during face-to-face assembling process of both core halves 2 and 3. Namely, as shown in the front view of FIG. 3, since only the portions where the two cores 5 and 9 face each other function as a head, and the deviated and protruded portions do not function as a head, the track width is always defined by the size $T_1$ of the thin film core 5. Since the first core half 2 is formed by thin film forming technique, the track width, i.e the length $T_1$ of the thin film core 5, is very accurate, while the track pitch P is also very accurate. Accordingly, in the process of stacking a plurality of block cores 9 and the spacers 10 alternately, there is no need to effect high accuracy finishing, namely, it is not required to polish adhering surfaces of these members in advance. This means that block cores 9 and spacers 10, which have been simply cut from a material in mass, may be adhered to each other to form the second core half 3, and therefore, there is an advantage that the number of manufacturing processes can be drastically reduced. Namely, size accuracy of the track width and track pitch etc. are made high by forming the first core half 2 by thin film forming technique. FIG. 4 shows that the track-width direction dimension of the block cores 9 varies throughout a plurality of block cores 9. However, since the effective track width is defined by $T_1$ as described in the above, such variation in the dimension of block cores 9 does not result in a variation in effective track width. Furthermore, since the second core half 3 is made of a block-stacked member in the same manner as in normal coil-wound magentic heads, the U-shaped winding groove 9a thereof prevents the cores 5 and 9 from being close to each other. Therefore, a short-circuited magnetic path is not formed, and thus a high intensity magnetic field which is substantially the same as that of winding magnetic heads can be obtained.

FIG. 4 is a schematic cross-sectional side view of another embodiment of the multi-track magnetic head according to the present invention. This embodiment multi-track magentic head 11 differs from the first embodiment in that a coil 12 made of a wire is wound around the web W of the block core 9 of the second core half 3, and the second core half 3 is constructed in a similar way to normal coil-wound heads. In detail, a plurality of U-shaped block cores 9 are provided so that each block core 9 is equipped with a coil wound around the web W. Then the block cores 9 each having the coil 12 are stacked with interposition of spacers 10. Since the web W is equipped with the coil 12, a pair of spacers 10 (not shown) is interposed between front and rear ribs R1 and R2 of two consecutive block cores 9 to form a plate like block-stacked second core half 2.

The advantage of the second embodiment is that it is possible to obtain higher magnetic field output than the first embodiment because of the provision of the wire-wound coil. Since the first core half 2 is constructed by thin film forming technique in the same manner as in the first embodiment, the size accuracy of track width, track pitch etc. is high, while fabrication is also easy. The above-mentioned block core 9 may be made of the same material as that of the first embodiment.

Figure 5:
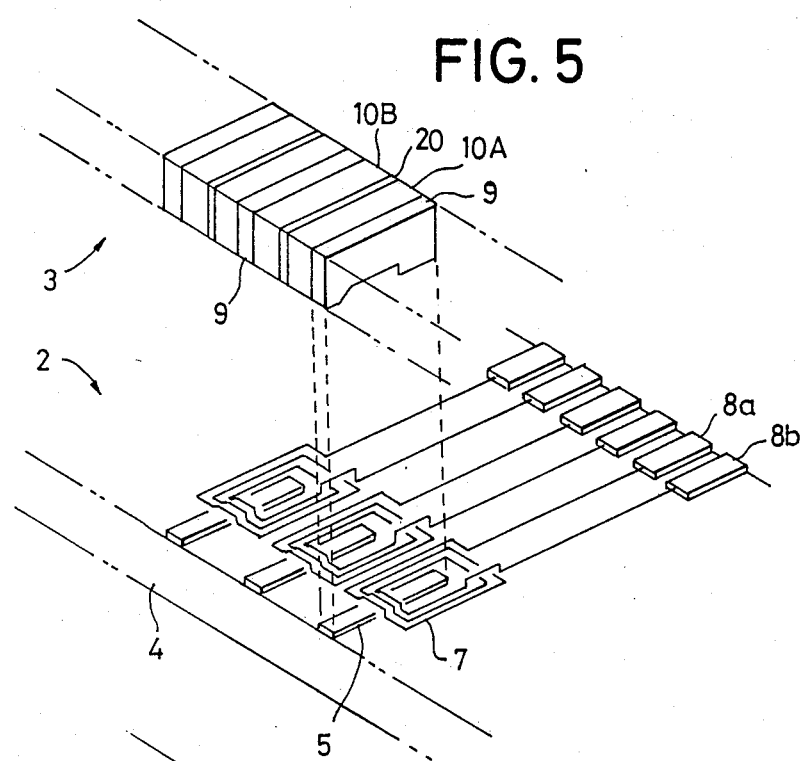
FIG. 5 is a schematic perspective exploded view of a third embodiment of the multi-track magnetic head according to the present invention.
Figure 6:
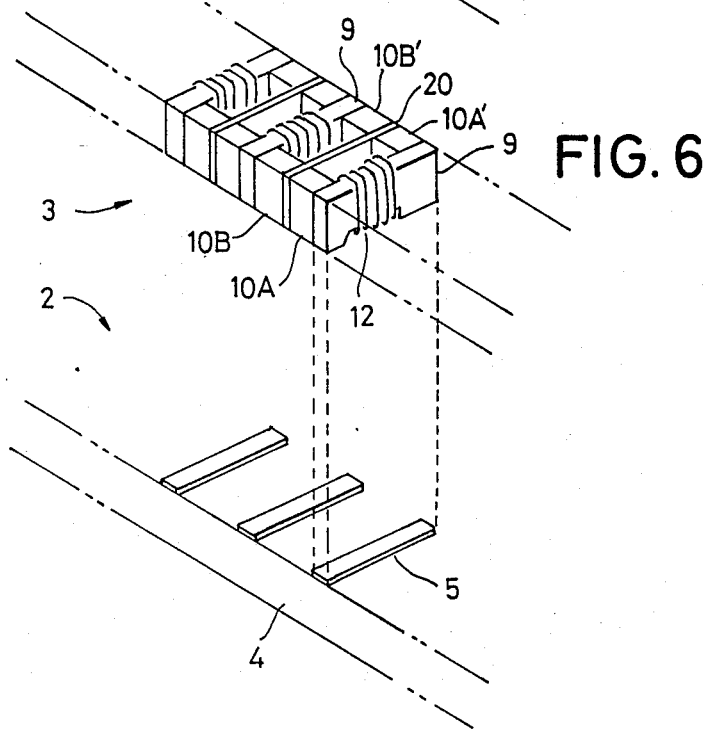
FIG. 6 is a schematic perspective exploded view of a fourth embodiment of the multi-track magnetic head according to the present invention.

Reference is now made to FIGS. 5 and 6 which respectively show third and fourth embodiments or modifications of the above-described first and second emobidments. The third embodiment of FIG. 5 differs from the first embodiment of FIGS. 1 and 2 in that shielding plates 20 are interposed between two consecutive spacers 10A and 10B. In detail, each spacer 10 of the first embodiment is replaced with a stack of two spacers 10A and 10B and a shielding plate 20 interposed between these spacers 10A and 10B.

Each of the shielding plates 20 is made of a magnetic material, such as permalloy, ferrite or the like. However, if desired the shiedling plate may be covered by copper films or sheets. The thickness of each shielding plate 20 may be between 10 and 200 micrometers. For instance, when the multi-track head is designed to be used for a cassette tape, which has 3.8 mm width, and when the number of tracks is between 10 and 20, the thickness of the shielding plate would be several tens of micrometers. Although thicker shielding plates provide higher shielding effect, the thickness of the same may be determined in view of the tape width, the number of tracks, the size of the block core 9.

FIG. 6 shows a fourth embodiment which only differs from the second embodiment of FIG. 4 in that the above-mentioned shielding plates 20 are added. Namely, each shielding plate 20, which is substantially the same as that of FIG. 5, are interposed between two pairs of spacers 10A, 10A', 10B and 10B'. As described in connection with FIG. 4, since the multi-track head of FIG. 6 has wire-wound coils 12, each block core 9 is connected via two spacers 10A and 10A' to the spacer 20 at its one side so that an open space is provided around the block core 9 for the wire-wound coil 12.

The provision of the above-described shielding plates in the third and fourth embodiments of FIGS. 5 and 6 provides an advantage that undesirable cross-talk between adjacent heads as remarkably reduced. According to experiments, cross-talk has been reduced by 10 to 20 dB compared to the case in which no shielding plates are employed. Therefore, it is possible to provide high quality mutli-track heads with such shielding plates added. Furthermore, cross-talk reduction by the shielding plates 20 makes it possible to provide a high density multi-track head. Namely, when it is intended to increase the number of tracks with the entire size of the multi-track head being kept constant, the shielding plates 20 may be used to prevent cross-talk between adjacent tracks or heads.

As described in the above, since the multi-track magnetic head according to the present invention is formed of the first and second core halves 2 and 3 respectively having the above-described strucure, fabrication of the multi-track magnetic head is readily performed and thus the manufacturing cost is low compared to wire-wound type heads, while it is possible to obtain higher magnetic field compared to thin film heads. Furthermore, due to the fact that the length of the core of the second core half 3 in the direction of track width is made larger than the length of the thin film core of the first core half 2 in the direction of track width, the thin film core 5 of the first core half 2 is readily received within the length $T_2$ of the block core of the second core half 3 when both core halves 2 and 3 are assembled. As a result, it is insured that the length of the thin film core 5 in the direction of track width necessarily equals the track width, and therefore, the second core half 3 may be manufactured in a relatively rough way, enjoying an advantage that strict size accuracy is not required. Moreover, since the track width, the track pitch etc. are determined by the accuracy of the first core half 2 formed by thin film forming technique, this accuracy is extremely high, and therefore, many advantages of easy fabrication, high productivity, low manufacturing cost etc. are obtained.

The above-described embodiments are just examples of the present invention, and therefore, it will be apparent for those skilled in the art that many modifications and variations may be made without departing from the spirit of the present invention.

What is claimed is:

1. A multi-track magnetic head, having a plurality of heads arranged in line, each of said heads comprising:
  (a) a substrate;
  (b) a thin film core formed on one surface of said substrate and partially covering said surface, one end of said thin film core being located that said one end of said thin film core flush with one end of said substrate;
  (c) an insulating film formed on said thin film core and partially covering said thin film core at said one end, one end of said insulating film being located flush with said one end of said thin film core;
  (d) a U-shaped block core including front and rear ribs and a web interposed between said ribs, the front rib being secured to and flush with the flush end of said insulating film the rear rib being secured to said thin film core, and said intermediate web being spaced from said thin film core and insulating film layers by a predetermined distance; and
  (e) a winding having a portion received in a space defined by the surface of said insulating film and said intermediate web of said block core.

2. A multi-track magnetic head as claimed in claim 1, wherein said winding comprises a thin film formed on said insulating film.

3. A multi-track magentic head as claimed in claim 1, wherein said winding is wound around said web of said block core.

4. A multi-track magnetic head as claimed in claim 1, wherein said thin film core has a width in track width direction which is smaller than the width in track width direction of said block core.

5. A multi-track magnetic head as claimed in claim 1, wherin one end of said multi-track magnetic head is convexly curved.

6. A multi-track magnetic head as claimed in claim 1, further comprising terminals formed on said substrate, said terminals being electrically connected to said winding.

7. A multi-track magnetic head as claimed in claim 1, further comprising a plurality of spacers each interposed between adjacent block cores of said plurality of heads, each of said spacers being made of a nonmagentic material.

8. a multi-track magnetic head as claimed in claim 1, further comprising a plurality of spacers and a plruality of shielding plates, each of said shielding plates being interposed between two of said spacers which are respectively interposed between adjacent block cores, each of said spacers being made of a nonmagnetic material and each of said shielding plates being made of a magnetic material.

* * * * *